V. I. GRAY.
ALTERNATING CURRENT MOTOR AND CONTROLLING DEVICE THEREFOR.
APPLICATION FILED APR. 13, 1908.

987,979.

Patented Mar. 28, 1911.

2 SHEETS—SHEET 1.

Witnesses
James P. Barry,
Harry W. Galvin

Inventor
Vance I. Gray
By Whitmore Hulbert Whitmore
attys.

V. I. GRAY.
ALTERNATING CURRENT MOTOR AND CONTROLLING DEVICE THEREFOR.
APPLICATION FILED APR. 13, 1908.

987,979.

Patented Mar. 28, 1911.

Witnesses
James P. Barry
Harry W. Galvin

Inventor
Vance I. Gray
By Whitmore Hulbert Whitmore
attys.

UNITED STATES PATENT OFFICE.

VANCE I. GRAY, OF TOLEDO, OHIO, ASSIGNOR TO THE F. BISSELL COMPANY, OF TOLEDO, OHIO, A CORPORATION OF OHIO.

ALTERNATING-CURRENT MOTOR AND CONTROLLING DEVICE THEREFOR.

987,979.  Specification of Letters Patent.  Patented Mar. 28, 1911.

Application filed April 13, 1908. Serial No. 426,810.

*To all whom it may concern:*

Be it known that I, VANCE I. GRAY, a citizen of the United States of America, residing at Toledo, in the county of Lucas and State of Ohio, have invented certain new and useful Improvements in Alternating-Current Motors and Controlling Devices Therefor, of which the following is a specification, reference being had therein to the accompanying drawings.

It is the object of the invention to obtain a construction of alternating current motor and controlling means therefor which is especially adapted for use in the driving of light machinery, such for instance as sewing machines.

It is a further object to obtain a motor which is self-starting and which, together with its controlling mechanism, may be confined within the limits of space available, this being practically that occupied by the ordinary hand wheel of the machine and the space beneath this wheel and above the stand.

With these objects in view, the invention consists in certain features of construction as hereinafter set forth.

Figure 1:
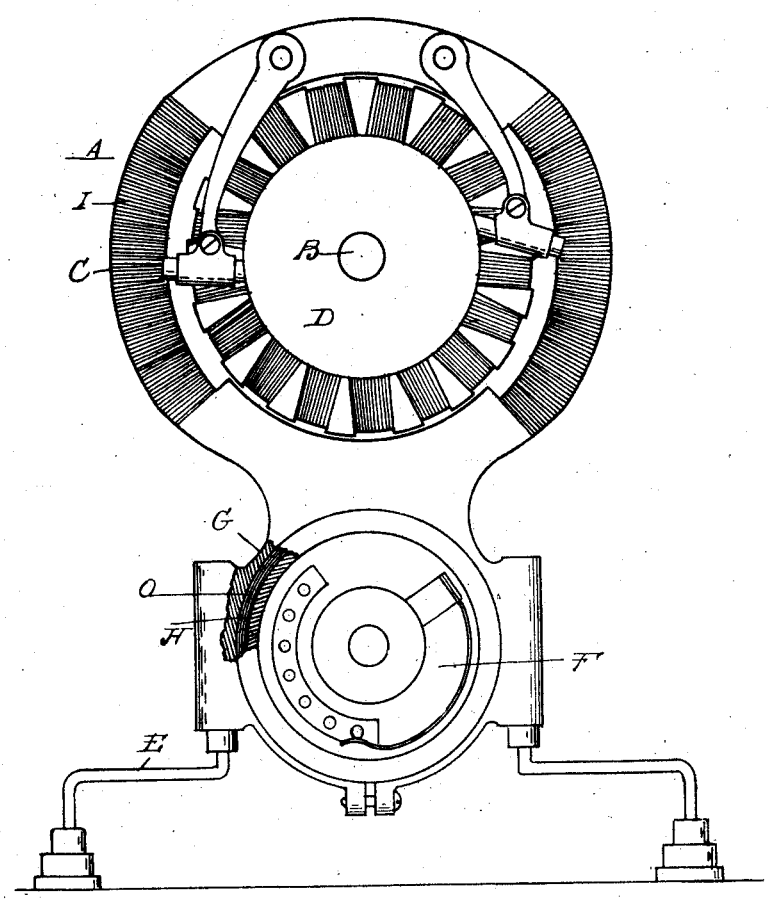
Figure 2:
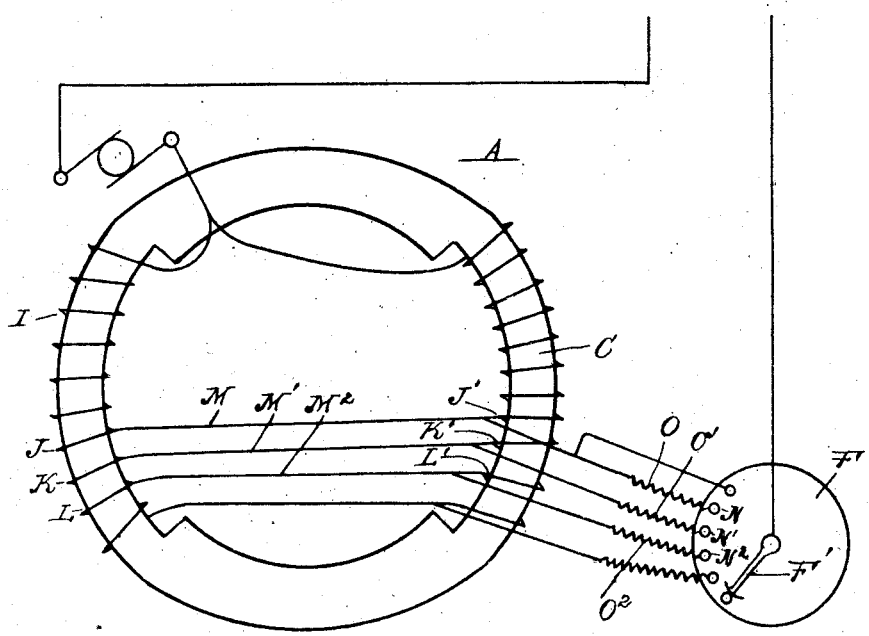

In the drawings—Figure 1 is a diagrammatic elevation of the motor and its controlling mechanism; Fig. 2 is a diagram of the electric circuits.

The general principle underlying the construction of the motor is that a motor organized as for operation with a direct current, and provided with similar commutator and brushes, is also operable with an alternating current, if the frequency of the latter is not too great, and if the ohmic resistance in relation to the E. M. F. is reduced. Such a motor will operate satisfactorily with currents of no greater frequency than sixty cycles, and may be controlled in speed of operation by a rheostat in the same manner as where used with a direct current.

With the present invention, a motor A of the type just described is employed and is preferably adapted to be mounted directly upon the shaft B of the sewing machine in place of the hand wheel, the stator C of the motor being centered by the rotor D thereof, and being also supported and held from rotation by spring pressed feet E resting upon the stand or other stationary part of the machine. The controlling mechanism for the motor is located in the space beneath the stator and above the stand, and comprises a rheostatic switch F preferably mounted in an annular frame G which depends from the stator frame. This switch is of the rotary type and is arranged within a hollow spool H preferably formed of porcelain or other insulating material, while the resistance windings, or a portion thereof, are wound around in a peripheral groove in this spool and between the latter and the annular frame G.

The general structural arrangement above described is one adapted for either direct current or alternating current motors, and with the former all of the resistances necessary for controlling the motor may be wound upon the spool H, the heat generated being dissipated by radiation from said spool and from the inclosing metallic frame. Where, however, the alternating current is used, it is difficult to arrange a sufficient resistance in this location without the generation of heat greater than can be safely dissipated. The means employed for avoiding this difficulty forms one of the special features of the present invention and involves the use of a combined inductive and non-inductive resistance constructed as follows: The stator of the motor is preferably of the bipolar type, having an annular core with one or more segments upon which the main windings I are placed. In addition to these windings, auxiliary windings are placed upon the core to form the inductive resistance for controlling the motor and these auxiliary windings are divided into sections arranged in pairs, J J', K K', L L', which are connected in parallel and are preferably upon opposite segments of the core. The arrangement is such that the bridge connections M M' M² between the members of each pair of segments are connected to the several contacts N N' N² of the rheostatic switch F, and by shifting the movable contact arm F' of said switch said sections may be successively cut in or out of the motor circuit.

It will be observed that the bridge connections M M', etc., will short circuit each of the several sections of the resistance, but the members of each pair are so arranged as to balance each other, the inductive effect in one being opposed by that in the other, which will prevent destructive induced currents. Inasmuch, however, as the auxiliary windings are cut in and out without break in the motor circuit, there will be an interval in which the adjacent contacts N N' of the switch F are cross connected by the movable contact member F', and this will form a short circuit of low resistance in which the inductive effects in the two members of the section are both in the same direction. The destructive induced current which would result from this condition is prevented by the placing of the resistance external to that upon the motor so that it will be included in in the short circuit just referred to. This external resistance may be connected in various ways but, as shown, is arranged between each of the bridge connections M M'. etc., and the corresponding contacts N N' of the switch. It is only necessary that these external resistances O O', etc., should be sufficient to diminish the volume of the induced current within safe limits, and sufficient wire for this purpose may be readily placed around the periphery of the spool H and within the annular frame G.

With the construction described, the motor may be operated at any speed desired by merely shifting the switch F, which will successively cut in or out the auxiliary windings and as each section is cut out will include a pair of the external resistances O O' in the temporary short circuit formed by bridging between adjacent contacts N N'.

What I claim as my invention is:

1. In an alternating current motor, the combination with main windings, of auxiliary windings in inductive relation thereto, and comprising pairs of coils in multiple series with said main windings, the members of said pairs being in inductive balance, bridge connections between said members of the pairs, a series of contact points, a connection including a resistance between each contact point and the bridge connection between the members of each pair of the coils, and a movable contact coöperating with said contact points, for the purpose described.

2. In an alternating current motor, the combination with main windings, of auxiliary windings in inductive relation thereto, comprising pairs of coils in multiple series with said main windings, bridge connections between the members of each pair, and means for cutting out said auxiliary windings and for introducing resistance in the auxiliary windings during the cutting out thereof.

In testimony whereof I affix my signature in presence of two witnesses.

VANCE I. GRAY.

Witnesses:
L. A. ALEXANDER,
AMOS L. CONN.

---

Copies of this patent may be obtained for five cents each, by addressing the "Commissioner of Patents, Washington, D. C."